Jan. 23, 1951 R. H. RANGER 2,538,800
STEREOSCOPIC RADAR
Filed Oct. 6, 1944 6 Sheets-Sheet 1

INVENTOR
RICHARD H. RANGER
By William D. Hall
ATTORNEY

INVENTOR
RICHARD H. RANGER
BY William D. Hall.
ATTORNEY

Jan. 23, 1951 R. H. RANGER 2,538,800
STEREOSCOPIC RADAR
Filed Oct. 6, 1944 6 Sheets-Sheet 5

INVENTOR
RICHARD H. RANGER
BY William D. Hall
ATTORNEY

Patented Jan. 23, 1951

2,538,800

UNITED STATES PATENT OFFICE 2,538,800

STEREOSCOPIC RADAR

Richard H. Ranger, Newark, N. J.

Application October 6, 1944, Serial No. 557,542

6 Claims. (Cl. 343—11)

(Granted under the act of March 3, 1883, as amended April 30, 1928; 370 O. G. 757)

The invention described herein may be manufactured and used by or for the Government for governmental purposes, without the payment of any royalty thereon.

This invention relates to improvements in stereoscopic devices for use in connection with radio object locating systems, (which will herein be termed "radar") to determine the altitudes of targets.

There are two types of radar apparatus, known as the B presentation (or "B-scan" or "B-scope") and the V-beam presentation (or "V-scope"), which are admirably adapted for use with stereoscopic devices and methods of the type disclosed in my application Serial No. 542,423 filed June 27, 1944, now Patent No. 2,477,651 issued August 2, 1949.

It is, therefore, an object of this invention to provide a stereoscopic device for use with radar apparatus of the B-scan presentation type. An example of the "B-scope presentation" is described and illustrated in the patent to Feldman No. 2,419,205, April 22, 1947 (application filed November 4, 1942), under the designation "Class B indication" and "radar class B." Also see definitions in "Principles of Radar," by M. I. T. staff, the Technology Press, Cambridge, Mass. (from printings prior to September 1944). Note Chapter I, 1–10.

A further object is the provision of a stereoscopic device and method for use with radar apparatus of the V-beam presentation type.

These and other objects are attained by the novel construction and methods hereinafter described and illustrated by the accompanying drawings, forming a part hereof, and in which.

Figure 1:
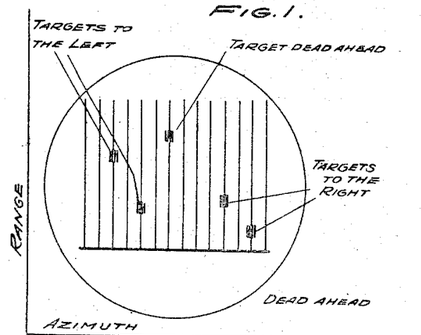
Figure 1 shows the face of a cathode ray tube of the B-scan presentation type. In this figure, the circle represents the boundary of the screen of the cathode ray tube; the horizontal line therein represents a base line (on which a scale of degrees azimuth (not shown) may be inscribed in the actual instrument or an adjustable range reference line produced by the electron beam) and the vertical lines in the circle represent projections of values of azimuth from the base line, or submultiples of vertical sweeps of the electron beam.

The B-scan type of radar presentation (see Figure 1) plots range against azimuth. Usually an electromagnetic cathode ray tube is used. The sweep current flows through the vertical deflecting coils. A positioning current controlled by the antenna position flows through the horizontal deflecting coils, so that the position of the vertical sweep is alined with the position in azimuth of the antenna, which may scan a region up to 90° on either side of the dead ahead line. The return signals are used with an intensity modulated oscilloscope to cause the target indications to appear on the screen.

Figure 3:
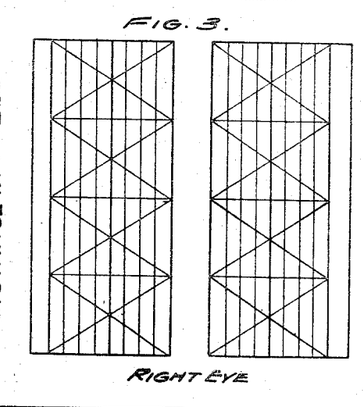
Figure 4:
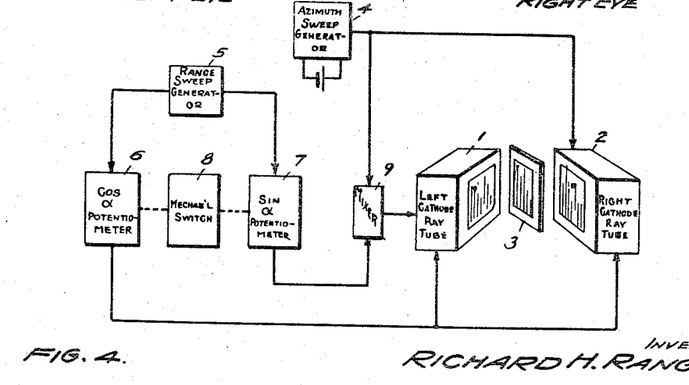
Figure 4 is a block diagram of the stereoscopic device and the B-scan presentation type radar.

Referring to Figure 4, there is shown a block diagram of the arrangement of devices for employing B-scan type of presentation in my invention. A left cathode ray tube 1 and a right cathode ray tube 2 are employed. The faces of tubes 1 and 2 are arranged substantially at right angles to each other, and positioned before the face of the tube 1 is a mirror 3 arranged to reflect the image of the face of the left tube 1 in interpupillary spacing with an observation point on a direct line to the center of the face of tube 2. The observer views the face of the right tube 2 directly with the right eye, and simultaneously views with the left eye the reflected image of the face of the left tube 1 in the mirror so that stereopsis is perfected combining the two images in the eyes of the observer. Positioned over the face of the left tube 1 is a sheet of transparent material having thereon a diagram as shown in Figure 2, and positioned over the face of the right tube is a transparent sheet having marked thereon a diagram as shown in Figure 3.

The azimuth or horizontal sweep of the tubes is furnished by the generator 4, the output of which is fed directly to the right tube. The range or vertical sweep is provided by generator 5, the output of which is passed through one potentiometer 6 which varies the sweep voltage in accordance with the cosine of the angle of elevation of the antenna of the radar device. The output of the potentiometer, which is the voltage of sweep generator 5 varied in accordance with the cosine of the angle of elevation of the antenna, is applied directly to vertical deflecting coils of tubes 1 and 2. Another output of the sweep voltage from generator 5 is modified in accordance with the sine of the angle of elevation of the antenna and this is added in the mixer 9 with the voltage from the azimuth generator 4, and the output of the mixer is applied to the horizontal deflecting coils of the left tube 1.

Figure 2:
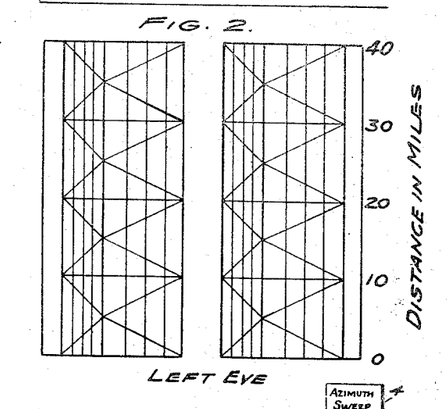
Figures 2 and 3 are diagrams used in the stereoscopic device for the B-scan type.
Figure 5:
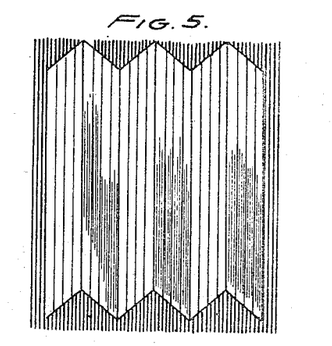
Figure 5 is a view illustrating the stereoscopic effect produced.

When the faces of the tubes 1 and 2 are viewed as above described the diagrams of Figures 2 and 3 produce a stereoscopic effect, and the position of the return signal from the target with reference to the lines of the diagrams will give the altitude of the target directly. When the faces are viewed stereoptically, the two diagrams blend into each other and have the appearance of a series of valleys and ridges with lines thereon. See Figure 5. Of course, the diagrams are calibrated by making observations on planes at known altitudes and distances away.

The reason for having the parallax for elevation change displayed all on one oscilloscope (in this case the left one) is so that the other, the right, will indicate directly true azimuth and ground distance of any target picked up, as a simple conventional B-scope system.

Figure 13:
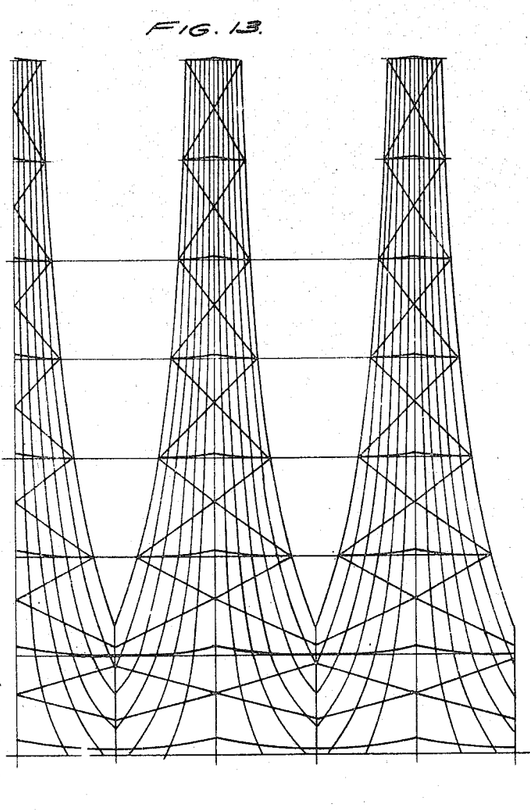
Figure 13 is a view of a transparent sheet having a plurality of diagrams for the right eye in the V-beam presentation.
Figure 14:
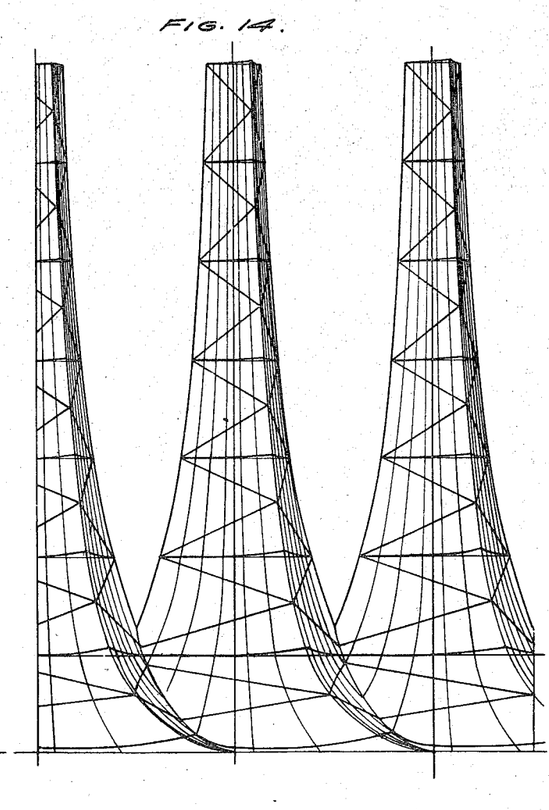
Figure 14 is a view of a transparent sheet having a plurality of diagrams for the left eye.

As a means of giving complete horizontal and vertical radar coverage, there has been developed the V-beam presentation, which consists of two sheet transmissions, one vertical and the other inclined at 45 degrees to the horizontal and its base rotated 10 degrees azimuthally from the vertical sheet. This type of presentation is diagrammatically shown in Figure 15. It will be seen that the device comprises a vertical antenna 31, at 10 degrees variation in azimuth to an antenna 32, which is inclined 45 degrees to the horizontal. The antennas are mounted on a constantly rotating turntable 33 so that antenna 31 first receives a signal from a target, and at a later time depending on the elevation of the target, the 45 degrees antenna 32 receives a signal from the same target. These signals appear on the screens of the cathode ray tubes, and the positions of the spots on the screens has been used to determine the altitude of the target. This is the usual method employed. With my method, signals from the two antennas are passed respectively through radar receiver devices 34 and 35, which are connected respectively to cathode ray tubes of the B-type presentation 36 and 38, the faces of the tubes being at a suitable angle to each other. Positioned between the faces of the tubes 36, 38 there is a vertical mirror 37 in which the image of the face of tube 36 is viewed with the left eye, while the right eye views the face of tube 38 directly. Respective maps, not shown, may cover the faces of the tubes, and over the maps are placed transparent sheets on which are drawn diagrams as shown in Figures 13 and 14 and constructed as hereinafter described.

Figure 15:
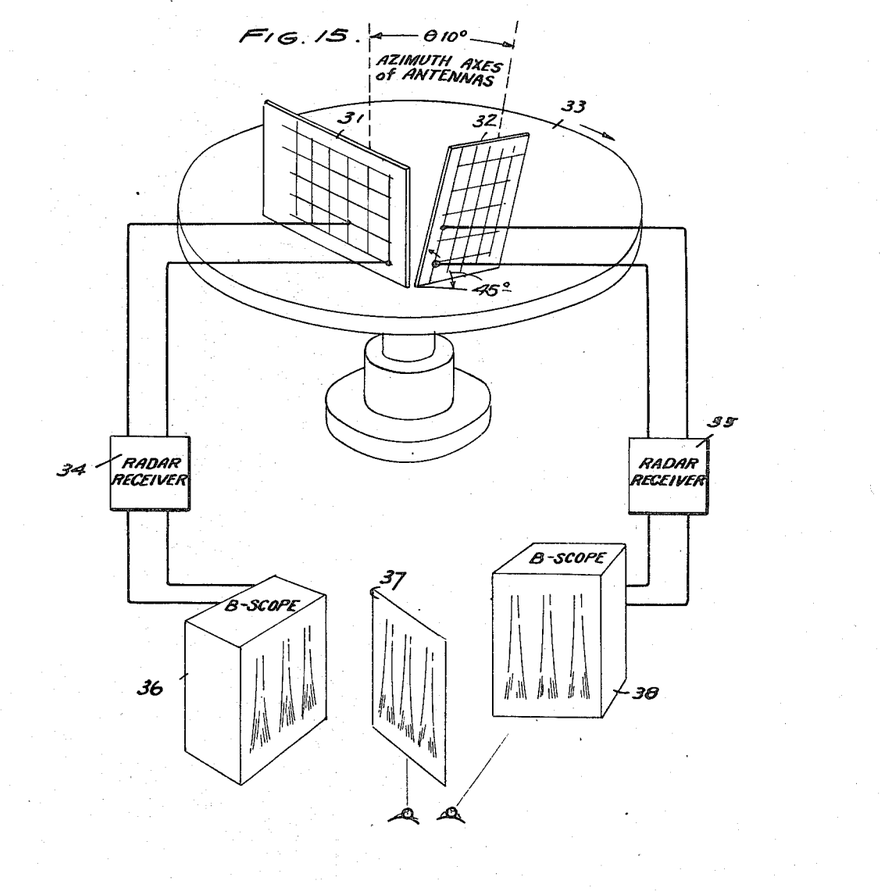
Figure 15 is a schematic diagram of the combination of a V-beam presentation radar apparatus and cathode ray oscilloscopes arranged for stereoscopic effects.

The azimuth axes of these two antennas are displaced relatively by 10 degrees so that the inclined sheet leads the vertical sheet by this angular amount, as the platform 33 rotates in clockwise direction.

Figures 6, 7, 8:
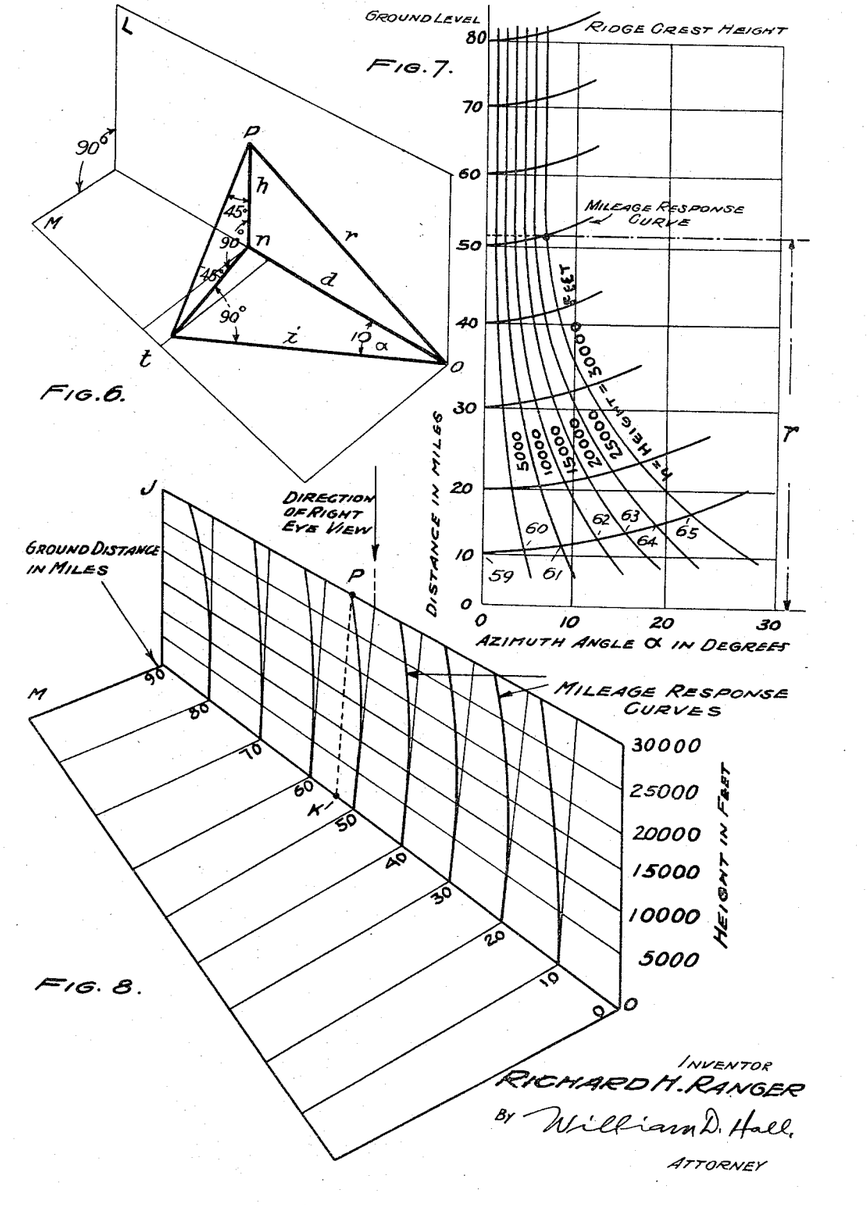
Figure 6 is a diagram explanatory of the V-beam stereoscopic presentation.
Figures 7, 8, 9, 10 show steps in the construction of diagrams for producing stereoscopic effects with the V-beam presentation.

As is shown in Figure 6, the radar antenna is located at the point marked 0.

Let an aircraft be supposed located at the point $p$ to the upper left. This point $p$ is at an elevation $h$ and at a ground distance $d$ out from the radar antenna and at a slant range of $r$ from the radar antenna. It is seen that the vertical sheet will give a response when it hits the place directly on the azimuth line of the vertical antenna. It is to be noted that the beam width in azimuth approaches an accuracy of two tenths of a degree with the V-beam. This angular accuracy aids materially in locating elevations accurately.

The 45-degree inclined antenna sheet 32 will not hit the point $p$ until the radar antenna mount has rotated an extra angle "$a$" (Fig. 6) in addition to the normal 10-degree displacement for the azimuth lines of the two antennas. (Horizontal displacement with angular rotation is reversed for the left B scope to compensate for the mirror reversal in the stereoscope; so increasing angles are clockwise for the left B scope.)

If the point $p$ were on the ground at the position marked $n$, it is obvious that if a response were obtained it would occur at the instant the azimuth line of the inclined sheet hits the same azimuth as indicated by the line $d$. However, for a height $p$, the inclined sheet will have to advance the angle "$a$" beyond the azimuth direction $d$ to the line marked $i$. It is then seen that the inclined sheet at 45 degrees up from the line $i$ must strike the point $p$.

It is seen that a series of right triangles builds up this picture namely $Otn$, $Otp$, $Onp$, and $tnp$ which latter is also an isosceles triangle with each of its acute angles equal to 45 degrees.

By geometry, it is therefore seen that the following relationships exist:

$$r^2 = h^2 + d^2$$
$$h = h_1$$
$$\tan a = \frac{h}{d} a = \tan^{-1}\frac{h}{d}$$

Using these relationships, Figure 7 was drawn up from tabulated calculations where $d$ was taken in intervals of 10 miles or 52,800 feet and $h$ was taken at successive 5000-foot elevations up to 30,000 feet.

Two B scopes 36, 38, are used for the stereopresentation of the V-beam. One of these B presentations is assumed in this case to work from right to left as the radar rotates. In order to build up a square area to be included in the B scope presentation, it is assumed that a 180 degree rotational coverage would be shown at one time.

As 80 miles is shown vertically upwards from zero to 80 in steps of ten miles each, it is obvious that for a square, a width equivalent to this 80 miles must likewise be extended to the left to cover the 180 degrees. On this assumption, the 180 degrees will have the same linear displacement in a horizontal direction as the 80 miles in the vertical. For example, a six inch square is assumed to be available on the scopes. Then the vertical distance of eighty miles is represented by six inches vertically on the oscilloscope face. On this basis, 30 degrees is one-sixth of this distance horizontally or one inch in width.

It is to be noted that the 10 mile distances are indicated as curves. This arises due to the fact that $r$ does not equal $d$. In fact, $r$ is always greater than $d$. Therefore, for a 10-mile distance, for example, the actual response up vertically from the degrees axis will be increasingly lengthened as the height increases. The mileage curves are therefore adjusted for this situation. This is illustrated in Figure 8.

It now becomes necessary to build up a reference grid to observe on the one hand the vertical sheet responses by the right eye and the inclined sheet responses by the left eye on the other.

It is obvious that the normal B scope response will work perfectly for the right eye. In other words, as the radar antenna mount rotates, a vertical trace will precess from left to right in a parallel movement equalling the angular rotation of the radar.

A similar B scope presentation will also be used for the left eye but it will precess from right to left. However, its response will be modified from that of the right B scope, first, by the 10-degree fixed separation between the azimuth axes and secondly, by this lag in response with increasing elevation of the target.

The 10-degree constant separation is taken care of once and for all by seeing to it that the sweep left to right for the right B scope starts at exactly for the same azimuth axis that the sweep right to left starts for the left B scope.

Without any further arrangement, it is obvious that the B scope image presentation for the left eye will now move to the left an extra amount measuring the height of the target.

It is assumed that the two B scopes are placed at right angles to each other as has been described previously for the right angle stereoscope, with a mirror reflecting the left B scope for the left eye.

Under these arrangements, whatever deflection is given the curve to the left on the left B scope will appear to be to the right, because of the mirror reversal coming to the left eye. Therefore, for increasing elevation, the target spot will appear to be displaced further to the right and this is exactly right for the left eye to make the spot appear to be nearer the observer, and this may, of course, represent height above the ground level.

This apparent height will be much greater than the actual height due to the fact that the displacement to the right is for a 45-degree sheet instead of the normal 9.5 degree parallax assumed in our previous right-angle stereoscopic work.

This is of not serious consequence in that it merely means that all elevations will appear higher by this angular amount than they normally would.

Inasmuch as the range is generally so much greater than the elevation, this is not a handicap.

A means of indicating height consists in drafting reference diagrams one to be placed over the right B scope and the other to be placed over the left B scope. They are drawn to represent a figure which will have contour lines following the same general relationship as governed in the B scope set-up.

The problem now presents itself of giving a graphical image for stereoscopic presentation that will represent the situation as developed in Figure 7. The whole point is to take account of the fact that a target indicated in either sheet will be projected down to a single line. As the eye would see this same line if it were directly in the plane of that sheet, it is only necessary to make the stereoparallax fit this situation.

As shown in Figure 8, which consists of a representation of the vertical sheet on the right, above the horizontal plane, the right eye is assumed looking down on the vertical sheet on its edge. It is seen that the elevations are horizontal lines as shown and the response curves for the mileages bend back toward $j$ for the increased elevations.

Now, for the purpose of this stereo-parallax set-up with the right-eye image being for the vertical radar sheet, and the left-eye image for the 45 degree sheet, the following steps are taken:

The right eye will look down on the B presentation as shown in Figure 8, where the response will show up as a dot indicating a position such as $p$ out on the vertical sheet. This will be seen as a vertical projection down directly on the horizontal plane as indicated at the point $k$. For the left-hand image, the point $p$ will be shown as indicated at $g$ on Figure 9, described in more detail below.

In order to have these two combine to give an effect of height, it is necessary to build up a reference pattern.

An angle of 15 degrees is taken for the parallax in this case. This is ⅓ of the 45-degree angle of the inclined radar sheet and means that all heights will be three times the normal to be expected with that radar sheet. In other words, for the reproduction it is to be assumed that the radar sheet is inclined at 15 degrees instead of 45 and this brings all elevations to three times what they would normally be if the 45 degree angle were used. The reason for using the 15 degrees is to make the angle such that the eyes will accommodate themselves to it as they would have difficulty doing for 45 degrees.

With an angle of 15 degrees, it is then possible to construct an elevation diagram to represent these assumed heights at any given range. Such an elevation is shown for 10 miles at Figure 9. The figures to the left indicate elevations of 5,000 ft. levels up to 30,000 feet and are taken by construction directly from Figure 7. They are the vertical distances of the ten mile intersections at the various elevations above the ground line. For example for the 10 mile curve of Figure 7, there is laid out on line $oz$ of Figure 9 from the point 0 the distances 60—61, 61—62, 62—63, 63—64, 64—65, which correspond to the same distances indicated on Figure 7. By projection upwards at 15 degrees from these points on Figure 9 intersections are made along the vertical axis "$Of$" to indicate apparent height of points corresponding to left-eye impressions from the corresponding ground level points. To indicate these heights, apparent mountain ridges serve well. To build them assume a ridge with an isosceles cross section rising to the top point of $e$, Figure 9. For the slopes of this isosceles triangle, an angle of 22½ degrees is assumed for each side. Now, horizontal parallels are drawn as indicated by dotted lines to get the corresponding elevation indications on these slopes, as indicated from 0–30,000 feet. This information is then put together in Figure 10 to determine the actual left and right markings for each elevation point on each slope. The L's mark the left eye projections down at the 15-degree parallax to the base line and the R's mark the vertical projections down for the right eye image.

In the same manner that this is done for the ten mile distance, cross section triangles are accomplished for the 20, 30 mile and on up to 80-mile ranges.

Figure 11:
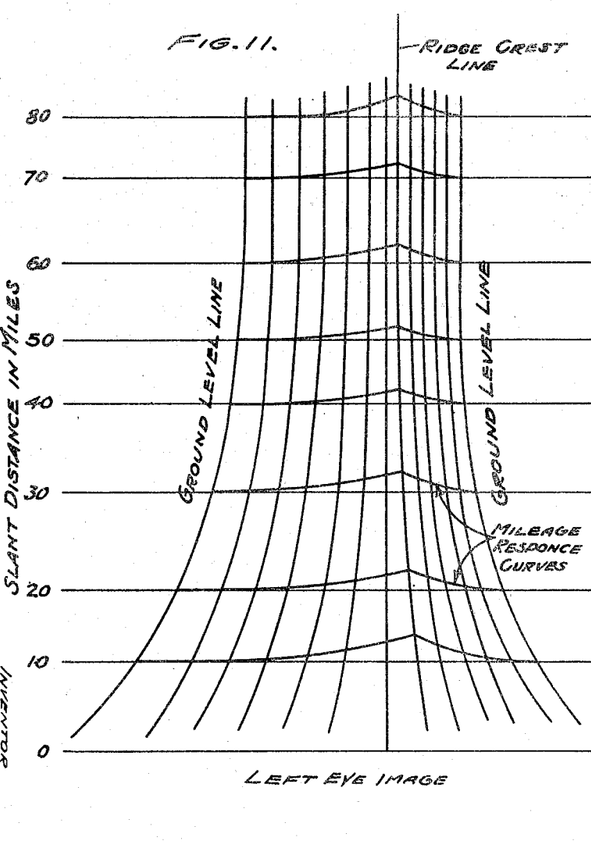
Figure 11 is a diagram for the left eye in the V-beam presentation.

On the basis of this information, Figure 11 is drawn up for the left-eye image where due account is taken of these projections for the left eye in each mileage indication. The slight variations due to the hypotenuse augmentations are introduced to curve these lines upward in the same manner that they were in the original Figures 7 and 8.

Figure 12:
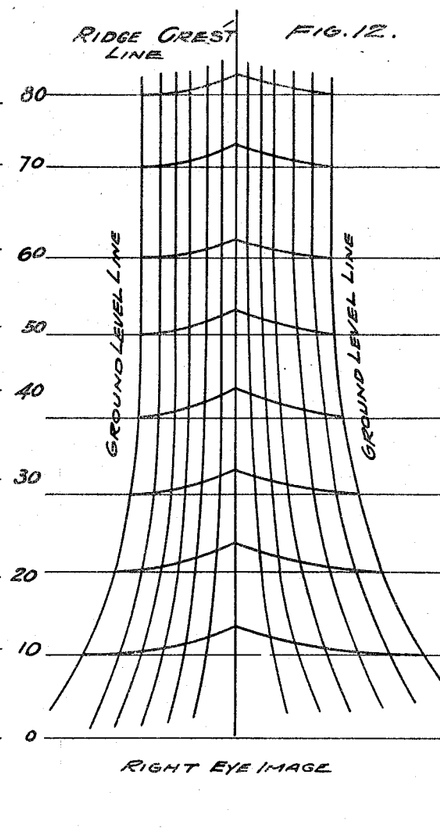
Figure 12 is a diagram for the right eye.

Figure 12 shows the basic projections for the right-eye image of the complete ridge.

Figure 13 is a compilation of several ridges, such as indicated in Figure 11 to build up a full picture for the left eye to take in.

Figure 14 is the corresponding correlation of ridges for the right eye, made up on the single ridge basis of Figure 12.

Figure 9:
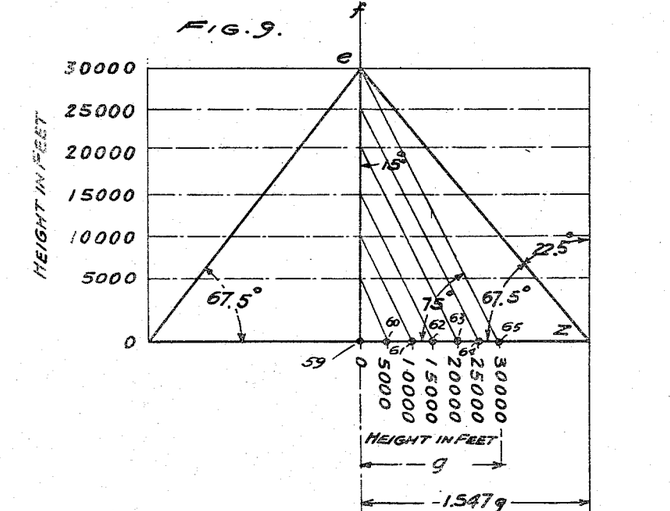
Figure 10:
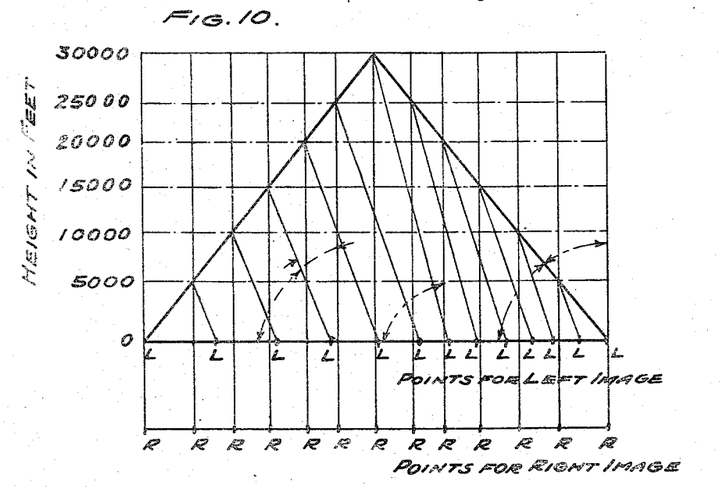

These grids having been perfected as described, either as in Figures 11 and 12, or as in Figures 13 and 14, on transparent material, and superposed upon the respective oscilloscope screen faces, when they are viewed by the respective eyes so as to be fused stereoscopically, they create an appearance of an elongated three-dimensional grid structure having sloping sides as suggested in Figures 9 and 10, with their base edges at ground level, and as if viewed from near one end of the grid structure.

The curves and convergence of the lines toward the opposite ends of the figures give an appearance of perspective with foreshortening such as would be observed in an actual body of the simulated shape when so viewed. The result is that the stereoscopic resultant gridwork appears to bound a space therewithin which has height, and distance suggested. A calibration of the line spacing will give range, elevation and azimuth values to the various parts of the stereoscopically combined image or stereogram. The spot produced by the stereoscopic fusing of the signal spots on the two screens will then appear within the grid as though suspended in space at a height and distance within the stereogram in relation to the grid lines which will correspond to the actual distance and height of the target from which the signals are derived, and graphically indicated in the stereogram by the measurement values of the lines in the gridwork.

I claim:

1. In combination with a radio object locating system apparatus having two antennas arranged at an angle to each other horizontally and one of the antennas inclined 45 degrees to the horizontal, a stereoscopic device comprising two cathode ray tube oscilloscopes operatively connected to the antennas with structure and circuits of the B-presentation type and having their tube faces arranged at an angle to each other, a mirror positioned between the face of one tube at such angle thereto that the image of the face of the tube in the mirror can be viewed with one eye while the face of the other tube is viewed directly by the other eye, means connecting the said one tube to one of the antennas and the said other tube to the other antenna, said means responsive to signals received on the antennas respectively to indicate position of the signal source in azimuth and elevation respectively on said oscilloscopes, and sheets of transparent material having diagrams of spaced lines thereon positioned over the faces of the tubes and constructed so that when viewed in stereopsis a gridwork bounding a three-dimensional space is simulated.

2. In an apparatus for determining the altitude of objects, a pair of sheet antennas arranged at an angle to each other, each antenna having a radio receiver connected thereto, respective cathode ray tube oscilloscopes connected to the receivers, said apparatus and oscilloscopes having structure and circuits constructed for presentation of the B type and having their tube faces arranged at an angle to each other, a mirror positioned before the face of the left tube at such angle thereto that the image of the face of the left tube can be viewed in the mirror with the left eye while the face of the right tube is viewed directly with the right eye, and diagrams of substantially tangent curves on the faces of the tubes, the diagram on the face of the left tube being offset and relatively modified to accommodate the parallax between the right and the left eye, the two diagrams being coordinated in proportions to each other so that when the two are viewed in stereopsis a reticular image structure bounding a three-dimensional space is simulated.

3. In an apparatus for determining the altitude of objects, a pair of sheet antennas with their axes arranged horizontally at an angle of ten degrees to each other, one of the antennas being vertical and the other antenna inclined at 45 degrees to the horizontal, each antenna having a radio receiver connected thereto, respective cathode ray tube oscilloscopes connected to the receivers, said apparatus and oscilloscopes having structure and circuits constructed for presentations of the B-type, the faces of the tubes being arranged at an angle to each other, a mirror positioned before the face of the left tube at such angle thereto and in such position that the image of the face of the left tube can be viewed by the left eye and the face of the right tube viewed directly by the right eye, and grid diagrams on the faces of the tubes comprising a plurality of curved lines constructed to compensate for the parallax between the two eyes, said lines being spaced in graduated series mutually coordinated so that when the two diagrams are viewed in stereopsis a reticular structure bounding a three-dimensional space is simulated having lines of definite height significance, said simulated structure having an appearance of perspective and foreshortening.

4. The structure of claim 6 wherein the faces of the oscilloscopes are spaced apart and in intersecting vertical planes and presented toward the inner sides of the angle formed by such intersection, and a mirror set before the face of one oscilloscope arranged to reflect an image of the latter face in stereoscopic parallax with a line to the center of the face of the other oscilloscope.

5. A stereoscopic radio object locating system comprising a scanning antenna device, two cathode ray oscilloscopes having sweep circuits operatively responsive to movements of the antenna, signal receiving means of the B-presentation type operatively connected with each antenna and respective oscilloscopes and constructed to transmit received object-reflected signals to the screens of the oscilloscopes to produce respective indications of a signal source thereon one of which is displaced from its axis differently from the displacement of the other from its axis, said difference proportionate to range and elevation of the reflecting object, respective line grid elements superposed on the oscilloscope faces constructed and relatively arranged to form stereoscopic contact in the vision of an observer viewing the oscilloscope faces simultaneously along said axes, and including lines principally in one direction in each oscilloscope and across a major dimension of its face, the two said grids being relatively constructed and relatively arranged to simulate at least one ridge-like three-dimensional reticular frame of appreciable height superposed on the stereoscopic image of the oscilloscope faces.

6. A stereoscopic radio object locating system comprising a scanning antenna device, two cathode ray oscilloscopes having sweep circuits operatively responsive to movements of the antenna, signal receiving means of the B-presentation type operatively connected with each antenna and respective oscilloscopes and constructed to transmit received object-reflected signals to the faces of the oscilloscopes to produce respective indications of signal sources thereon, an optical system constructed and arranged cooperatively in relation to the faces of the oscilloscopes to present images of the said faces in stereopsis, and means responsive to movement of one antenna to modify the normal horizontal sweep in one oscilloscope so as to distinguish it from the corresponding sweep in the other oscilloscope derived as a geometrical function of azimuthal position of a signal indication in such other oscilloscope but of negative effect, means being included to reverse the image of the face of one of the oscilloscopes in the direction of the difference.

RICHARD H. RANGER.

REFERENCES CITED

The following references are of record in the file of this patent:

UNITED STATES PATENTS

| Number | Name | Date |
| --- | --- | --- |
| 2,434,897 | Ayres | Jan. 27, 1948 |
| 2,440,250 | Deloraine | Apr. 27, 1948 |
| 2,449,542 | Ayres | Sept. 21, 1948 |